US010198692B2

(12) United States Patent
Arthur et al.

(10) Patent No.: US 10,198,692 B2
(45) Date of Patent: Feb. 5, 2019

(54) SCALABLE NEURAL HARDWARE FOR THE NOISY-OR MODEL OF BAYESIAN NETWORKS

(71) Applicant: INTERNATIONAL BUSINESS MACHINES CORPORATION, Armonk, NY (US)

(72) Inventors: John V. Arthur, Mountain View, CA (US); Steven K. Esser, San Jose, CA (US); Paul A. Merolla, Palo Alto, CA (US); Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 711 days.

(21) Appl. No.: 14/846,289

(22) Filed: Sep. 4, 2015

(65) Prior Publication Data

US 2015/0379398 A1    Dec. 31, 2015

Related U.S. Application Data

(63) Continuation of application No. 13/562,187, filed on Jul. 30, 2012, now Pat. No. 9,189,729.

(51) Int. Cl.
*G06N 3/08* (2006.01)
*G06N 3/04* (2006.01)
(Continued)

(52) U.S. Cl.
CPC ............... *G06N 3/08* (2013.01); *G06F 7/582* (2013.01); *G06N 3/04* (2013.01); *G06N 3/0472* (2013.01); *G06N 3/063* (2013.01); *G06N 7/005* (2013.01)

(58) Field of Classification Search
CPC .......... G06N 3/08; G06N 3/04; G06N 3/0472; G06N 3/062; G06N 7/005; G06N 3/063; G06F 7/582
See application file for complete search history.

(56) References Cited

U.S. PATENT DOCUMENTS 5,153,923 A   10/1992   Matsuba et al.
5,175,798 A * 12/1992   Taylor .................. G06N 3/0472
                                              706/25
(Continued)

FOREIGN PATENT DOCUMENTS

AU    2008100935 A4   11/2008
WO    2004097733 A2   11/2004

OTHER PUBLICATIONS

Fourcaud-Trocme, Nicolas et al. "How Spike Generation Mechanisms Determine the Neuronal Response to Fluctuating Inputs" 2003 [Online] Downloaded May 9, 2018 http://www.jneurosci.org/content/jneuro/23/37/11628.full.pdf.*
(Continued)

*Primary Examiner* — Ben M Rifkin
(74) *Attorney, Agent, or Firm* — Sherman IP LLP; Kenneth L. Sherman; Hemavathy Perumal

(57) ABSTRACT

Embodiments of the invention relate to a scalable neural hardware for the noisy-OR model of Bayesian networks. One embodiment comprises a neural core circuit including a pseudo-random number generator for generating random numbers. The neural core circuit further comprises a plurality of incoming electronic axons, a plurality of neural modules, and a plurality of electronic synapses interconnecting the axons to the neural modules. Each synapse interconnects an axon with a neural module. Each neural module receives incoming spikes from interconnected axons. Each neural module represents a noisy-OR gate. Each
(Continued)

neural module spikes probabilistically based on at least one random number generated by the pseudo-random number generator unit.

18 Claims, 11 Drawing Sheets

(51) Int. Cl.
  *G06N 7/00* (2006.01)
  *G06N 3/063* (2006.01)
  *G06F 7/58* (2006.01)

(56) References Cited

U.S. PATENT DOCUMENTS

| | | | |
|---|---|---|---|
| 5,212,766 A * | 5/1993 | Arima | G06N 3/063 706/25 |
| 5,475,795 A | 12/1995 | Taylor et al. | |
| 5,553,197 A * | 9/1996 | Clarkson | G06N 3/0472 706/15 |
| 5,564,115 A | 10/1996 | Clarkson | |
| 5,805,731 A | 9/1998 | Yaeger et al. | |
| 5,903,884 A | 5/1999 | Lyon et al. | |
| 5,905,789 A | 5/1999 | Will | |
| 5,917,891 A | 6/1999 | Will | |
| 6,480,621 B1 | 11/2002 | Lyon | |
| 6,560,582 B1 * | 5/2003 | Woodall | G06K 9/6267 706/15 |
| 7,016,886 B2 | 3/2006 | Cabana et al. | |
| 7,082,419 B1 | 7/2006 | Lightowler | |
| 7,130,694 B1 | 10/2006 | Voelkel | |
| 7,174,325 B1 | 2/2007 | Ascoli | |
| H2215 H | 4/2008 | Allen et al. | |
| 7,603,175 B2 | 10/2009 | Voelkel | |
| 7,751,900 B2 | 7/2010 | Voelkel | |
| 7,752,151 B2 | 7/2010 | Nugent | |
| 8,429,107 B2 | 4/2013 | Denneau et al. | |
| 8,756,184 B2 | 6/2014 | Li et al. | |
| 8,990,132 B2 | 3/2015 | Lo | |
| 2006/0056704 A1 * | 3/2006 | Bachmann | G06K 9/0063 382/224 |
| 2009/0313195 A1 | 12/2009 | McDaid et al. | |
| 2010/0299297 A1 | 11/2010 | Breitwisch et al. | |
| 2011/0004579 A1 | 1/2011 | Snider | |
| 2011/0153533 A1 | 6/2011 | Jackson et al. | |

OTHER PUBLICATIONS

Fourcaud, Nicolas and Nioclas Brunel. "Dynamics of the Firing Probability of Noisy Integrate-and-Fire Neurons" 2002 [Online] Downlaoded May 9, 2018 http://eds.a.ebscohost.com/ehost/pdfviewer/pdfviewer?vid=1&sid=b95e0ca5-9835-4a9b-9c1b-a0b5c93f20bb%40sessionmgr4010.*

Knight, Bruce. Dynamics of ENcoding in a Population of Neurons. 1972 [Online] Dopwnloaded May 9, 2018 http://jgp.rupress.org/content/jgp/59/6/734.full.pdf.*

Burkitt, A.N. "A review of the integrate-and-fire neuron model: I. Homogenous SYnaptic Input" 2006 [Online] Downloaded May 9, 2018 https://link.springer.com/content/pdf/10.1007%2Fs00422-006-0068-6.pdf.*

Srinivas, S., "A Generalization of the Noisy-Or Model," Proceedings of the Ninth International Conference on Uncertainty in Artificial Intelligence (UAI '93), Jul. 1993, pp. 208-215, Morgan Kaufmann Publishers, United States.

U.S. Non-Final Office Action for U.S. Appl. No. 13/562,187 dated Jul. 31, 2014.

U.S. Final Office Action for U.S. Appl. No. 13/562,187 dated Dec. 26, 2014.

U.S. Advisory Action for U.S. Appl. No. 13/562,187 dated Feb. 23, 2015.

U.S. Notice of Allowance for U.S. Appl. No. 13/562,187 dated Jul. 8, 2015.

* cited by examiner

SCALABLE NEURAL HARDWARE FOR THE NOISY-OR MODEL OF BAYESIAN NETWORKS

This invention was made with Government support under HR0011-09-C-0002 awarded by Defense Advanced Research Projects Agency (DARPA). The Government has certain rights in this invention.

BACKGROUND

Embodiments of the invention relate to neuromorphic and synaptronic computation, and in particular, a scalable neural hardware for the noisy-OR model of Bayesian networks.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neuron and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

Embodiments of the invention relate to a scalable neural hardware for the noisy-OR model of Bayesian networks. One embodiment comprises a neural core circuit including a pseudo-random number generator for generating random numbers. The neural core circuit further comprises a plurality of incoming electronic axons, a plurality of neural modules, and a plurality of electronic synapses interconnecting the axons to the neural modules. Each synapse interconnects an axon with a neural module. Each neural module receives incoming spikes from interconnected axons. Each neural module represents a noisy-OR gate. Each neural module spikes probabilistically based on at least one random number generated by the pseudo-random number generator.

Another embodiment comprises receiving one or more incoming spikes from one or more incoming axons in a neural network, and probabilistically generating an outgoing spike in response to said one or more incoming spikes. The outgoing spike is probabilistically generated based on or more random numbers using a noisy-OR gate model.

These and other features, aspects and advantages of the present invention will become understood with reference to the following description, appended claims and accompanying figures.

DETAILED DESCRIPTION

Figure 1:
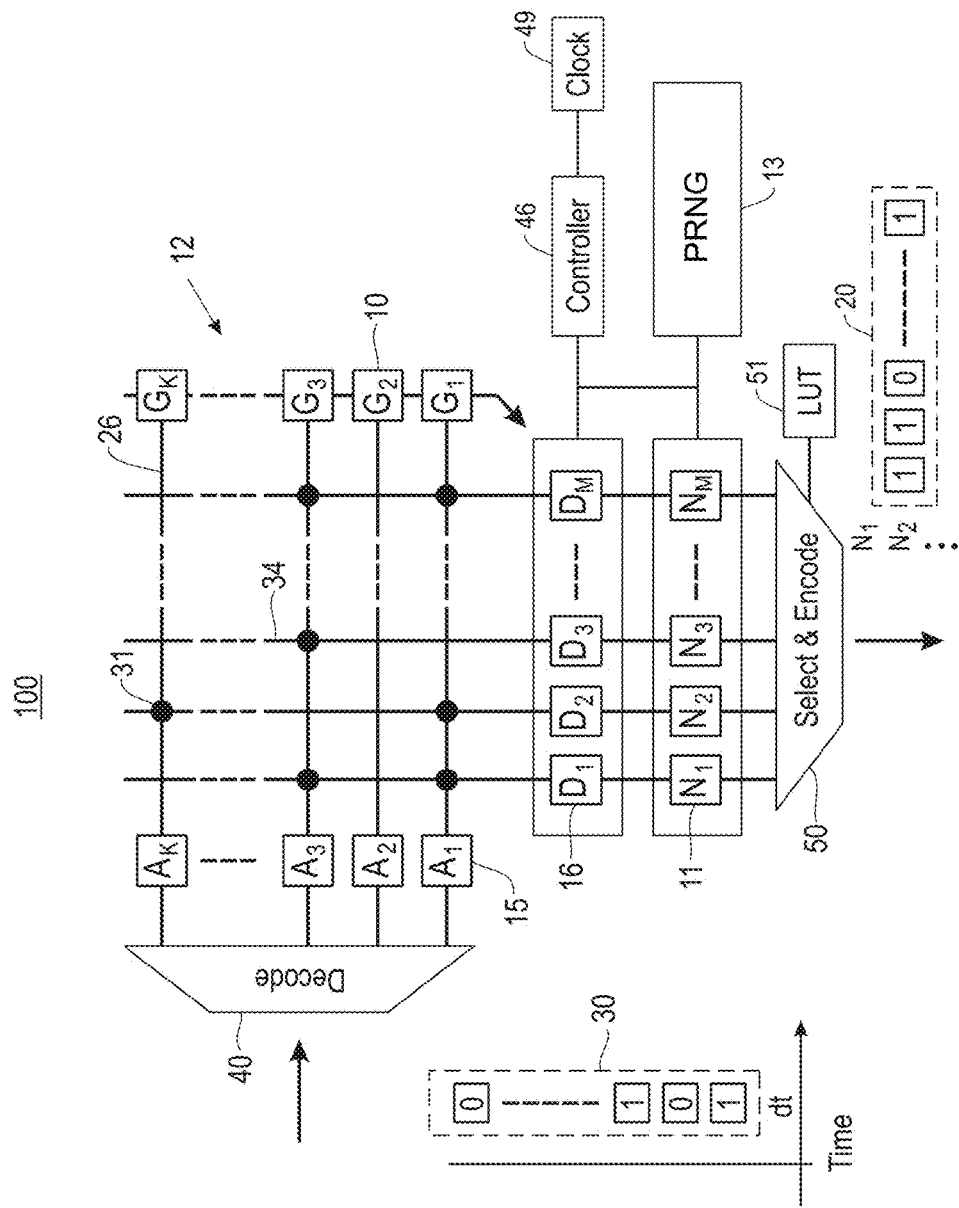
FIG. 1 shows a neural core circuit, in accordance with an embodiment of the invention.

Embodiments of the invention relate to a scalable neural hardware for the noisy-OR model of Bayesian networks. One embodiment comprises a neural core circuit including a pseudo-random number generator for generating random numbers. The neural core circuit further comprises a plurality of incoming electronic axons, a plurality of neural modules, and a plurality of electronic synapses interconnecting the axons to the neural modules. Each synapse interconnects an axon with a neural module. Each neural module receives incoming spikes from interconnected axons. Each neural module represents a noisy-OR gate. Each neural module spikes probabilistically based on at least one random number generated by the pseudo-random number generator.

Another embodiment comprises receiving one or more incoming spikes from one or more incoming axons in a neural network, and probabilistically generating an outgoing spike in response to said one or more incoming spikes. The outgoing spike is probabilistically generated based on or more random numbers using a noisy-OR gate model.

In one embodiment, each neural module integrates incoming spikes received from interconnected axons, and maintains at least one configurable probability value. Each probability value maintained in each neural module represents a probability that said neural module integrates an incoming spike. Each neural module computes a spiking probability, wherein the computed spiking probability represents a probability that said neural module generates an outgoing spike. For each neural module, the computed spiking probability is based on the number of integrated spikes and a probability value maintained in said neural module. Each neural module retrieves a random number from the pseudo-random number generator, and generates an outgoing spike only if the retrieved random number is less than the computed spiking probability.

In another embodiment, each neural module maintains at least one configurable probability value, wherein each probability value maintained in said neural module represents a probability that said neural module integrates an incoming spike. Each neural module receives incoming spikes from interconnected axons. For each incoming spike received, each neural module retrieves a random number from the pseudo-random number generator, and integrates said incoming spike only if the retrieved random number is less than a probability value maintained in said neural module. Each neural module generates an outgoing spike only if the number of integrated spikes exceeds a configurable spiking threshold of said neural module.

In one embodiment, the neural core circuit is organized into a scalable noisy-OR neural network including multiple layers of neural core circuits, wherein outgoing spikes from neural modules of a layer are routed to incoming axons of a subsequent layer.

The term electronic neuron as used herein represents an architecture configured to simulate a biological neuron. An electronic neuron creates connections between processing elements that are roughly functionally equivalent to neurons of a biological brain. As such, a neuromorphic and synaptronic system comprising electronic neurons according to embodiments of the invention may include various electronic circuits that are modeled on biological neurons. Further, a neuromorphic and synaptronic system comprising electronic neurons according to embodiments of the invention may include various processing elements (including computer simulations) that are modeled on biological neurons. Although certain illustrative embodiments of the invention are described herein using electronic neurons comprising electronic circuits, the present invention is not limited to electronic circuits. A neuromorphic and synaptronic system according to embodiments of the invention can be implemented as a neuromorphic and synaptronic architecture comprising circuitry, and additionally as a computer simulation. Indeed, embodiments of the invention can take the form of an entirely hardware embodiment, an entirely software embodiment, or an embodiment containing both hardware and software elements.

Embodiments of the invention provide neurons ("neural modules") that model noisy-OR gates. The noisy-OR neural modules may be used to perform Bayesian computations, such as performing statistical interference, recognizing patterns, and classifying inputs.

FIG. 1 shows a neural core circuit 100, in accordance with an embodiment of the invention. The neural core circuit 100 comprises multiple pre-synaptic axons 15 and multiple post-synaptic noisy-OR neural modules 11. Specifically, the neural core circuit 100 comprises K axons 15 and M neural modules 11, such as axons $A_1, A_2, A_3, \ldots,$ and $A_K$, and neural modules $N_1, N_2, N_3, \ldots,$ and $N_M$, wherein K and M are positive integers. Each axon 15 and each neural module 11 has configurable operational parameters. Each neural module 11 is connected to a corresponding dendrite 16, wherein said neural module 11 receives incoming firing events (e.g., incoming spikes) via its corresponding dendrite 16. As shown in FIG. 1, the neural modules $N_1, N_2, N_3, \ldots,$ and $N_M$ have corresponding dendrites $D_1, D_2, D_3, \ldots,$ and $D_M$, respectively.

As described in detail later herein, each neural module 11 includes a neuron computation circuit that represents a noisy-OR gate. A noisy-OR gate is a canonical interaction model used to describe the interaction between multiple n causes $X_1, X_2, \ldots, X_n$ and their common effect Y. Each cause $X_i$ is assumed to be sufficient to cause Y independent of the present of other causes. In one embodiment, each neural module 11 shares the same neuron computation circuit (i.e., multiplexed) with its corresponding dendrite 16.

The neural core circuit 100 further comprises a synaptic crossbar 12 including multiple synapses 31, multiple rows/axon paths 26, and multiple columns/dendrite paths 34. Each synapse 31 communicates firing events between a pre-synaptic axon 15 and a post-synaptic neural module 11. Specifically, each synapse 31 is located at cross-point junction between an axon path 26 and a dendrite path 34, such that a connection between the axon path 26 and the dendrite path 34 is made through said synapse 31. Each axon 15 is connected to an axon path 26, such that said axon 15 transmits sends firing events to the connected axon path 26. A corresponding dendrite 16 of each neural module 11 is connected to a dendrite path 34, such that said neural module 11 receives firing events from the connected dendrite path 34.

Further, each axon 15 has a corresponding memory unit 10 maintaining two or more bits of information designating an axon type (e.g., excitatory, inhibitory) of said axon 15. As shown in FIG. 1, the axons $A_1, A_2, A_3, \ldots,$ and $A_K$ have corresponding memory units $G_1, G_2, G_3, \ldots,$ and $G_K$, respectively. The operational parameters of each neural module 11 includes a strength parameter for each axon type. Each spike integrated by a neural module 11 is weighted based on a strength parameter for the axon type of the axon 15 that said spike is received from.

Each synapse 31 has a synaptic weight. The synaptic weights of the synapses 31 may be represented by a weight matrix W, wherein an element $W_{ij}$ represents a synaptic weight of a synapse 31 located at row/axon path i and column/dendrite path j of the crossbar 12. In one embodiment, the synapses 31 are binary memory devices. Each synapse 31 can have a weight "0" indicating that said synapse 31 is non-conducting, or a weight "1" indicating that said synapse 31 is conducting. A learning rule such as spike-timing dependent plasticity (STDP) may be applied to update the synaptic weights of the synapses 31.

In this specification, an axon vector 30 is used to represent the axon activity of every axon 15 of the neural core circuit 100 in a time step. Specifically, each index of the axon vector 30 represents the axon activity of a corresponding axon 15 of the neural core circuit 100. Each index with a bit-value of "1" indicates that a corresponding axon 15 has received a firing event in the current time step, wherein the firing event received was generated by a neuron in a previous time step. Each index with a bit-value of "0" indicates that a corresponding axon 15 has not received a firing event in the current time step. For example, as shown in FIG. 1, an axon vector 30 with values <1, 0, 1, . . . , 0> represents that axons $A_1$ and $A_3$ have received a firing event in the current time step.

The neural core circuit 100 further comprises an address-event decoder 40, an address-event encoder 50, and a lookup table (LUT) 51. The address-event decoder 40 is configured to receive address-event packets one at a time. Each address-event packet received includes a firing event generated by a neural module 11 in the same, or a different, neural core circuit 100. Each address-event packet further includes routing information, such as an address of a target incoming axon 15. The address-event decoder 40 decodes each address-event packet received and delivers the firing event in said address-event packet to the target incoming axon 15. Upon receiving a firing event, each axon 15 activates the axon path 26 it is connected to, triggering a read of the axon type of said axon 15 and all synaptic weights on the axon path 26.

In this specification, an output vector 20 is used to represent the neuron activity of every neural module 11 of the neural core circuit 100 in a time step. Specifically, each index of the output vector 20 represents the neuron activity of a corresponding neural module 11 of the neural core circuit 100. Each index with a bit-value of "1" indicates a firing event generated by a corresponding neural module 11 in the current time step, wherein the firing event will be routed to a target incoming axon 15 in the same, or a different, neural core circuit 100. Each index with a bit-value of "0" indicates that a corresponding neural module 11 did not receive sufficient input to generate a firing event. For example, as shown in FIG. 1, the output vector 20 with values <1, 1, 0, . . . , 1> indicates that neurons $N_1$, $N_2$, and $N_M$ are active (i.e., generated a firing event) and neuron $N_3$ is not active in the current time step. Each neuron $N_1$, $N_2$, and $N_M$ will send an address-event packet including the generated firing event to a target incoming axon 15 in the same, or a different, neural core circuit 100.

The address-event encoder 50 is configured to receive firing events generated by the neural modules 11. The LUT 51 is an address routing table configured to determine target incoming axons 15 for firing events generated by the neural modules 11 of the neural core circuit 100. A target incoming axon 15 may be an incoming axon 15 in the same neural core circuit 100 or a different neural core circuit 100. The LUT 51 maintains information such as target distance, direction, addresses, and delivery times. The information maintained in the LUT 51 is used to build an address-event packet for each firing event received.

The neural core circuit 100 further comprises a pseudo-random number generator (PRNG) 13. The multibit output of the PRNG 13 is thresholded to generate random numbers that are either 0 or 1 or can be compared to other values to generate binary spike outputs. Each neural module 11 is connected to the PRNG 13. As described in detail later herein, in each time step, each neural module 11 draws a random number from the PRNG 13 to implement the probabilistic spiking of said neural module 11. In another embodiment, each neural module 11 includes its own PRNG 13.

As shown in FIG. 1, the neural core circuit 100 further comprises a control module ("controller") 46 that is connected to a clock 49. The clock 49 produces clock signals used by the controller 46 to generate time-steps. The controller 46 divides each time-step into operational phases in the neural core circuit 100 for neuron updates, etc.

As described in detail later herein, each neural module 11 includes a neuron computation circuit that represents a noisy-OR gate.

Figure 2:
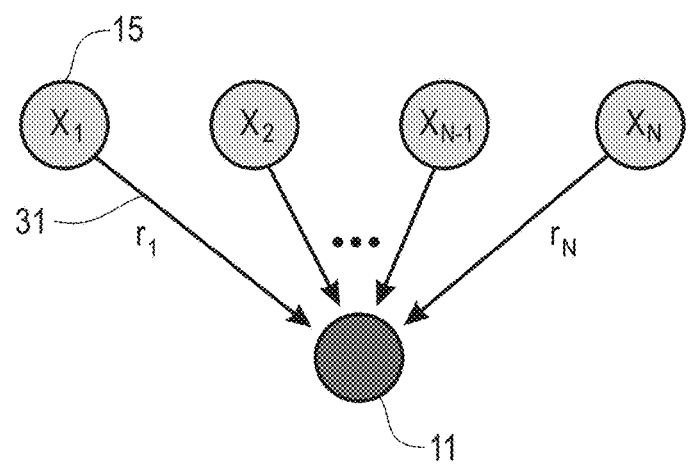
FIG. 2 shows a noisy-OR system including only one noisy-OR neural module, in accordance with an embodiment of the invention.

FIG. 2 shows a noisy-OR system 150 including only one noisy-OR neural module 11, in accordance with an embodiment of the invention. The system 150 comprises a set of N axons 15, such as axons $X_1$, $X_2$, . . . , $X_{N-1}$, and $X_N$. The system 150 further comprises a neural module 11 labeled as neural module Y in FIG. 2. Multiple weighted synaptic connections 31 interconnect the axons 15 to the neural module Y, wherein each synaptic connection 31 interconnects an axon 15 to the neural module Y. Each synaptic connection 31 has a synaptic weight.

The neural module Y is configured to function as an N-input noisy-OR gate, wherein the set of N axons 15 represent a set of N inputs. As shown in FIG. 2, each synaptic connection 31 interconnecting an axon $X_i$ to the neural module Y has a corresponding probability value $r_i$. For example, a synaptic connection 31 interconnecting the axon $X_1$ to the neural module Y has a corresponding probability value $r_1$, and a synaptic connection 31 interconnecting the axon $X_N$ to the neural module Y has a corresponding probability value $r_N$. For each firing event received from an axon $X_i$ via a synaptic connection 31, the neural module Y integrates said firing event with probability $r_i$.

Figure 3:
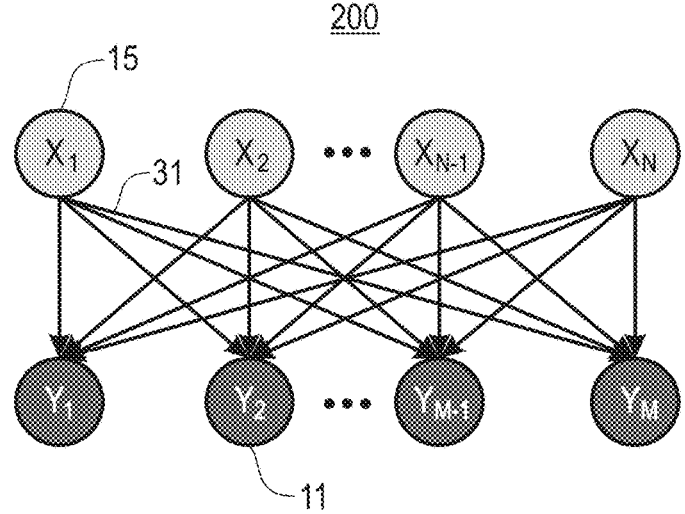
FIG. 3 shows a noisy-OR system including multiple noisy-OR neural modules, in accordance with an embodiment of the invention.

FIG. 3 shows a noisy-OR system 200 including multiple noisy-OR neural modules 11, in accordance with an embodiment of the invention. The system 200 comprises a set of N axons 15, such as axons $X_1$, $X_2$, . . . , $X_{N-1}$, and $X_N$. The system 200 further comprises a set of M neural modules 11, such as neurons $Y_1$, $Y_2$, . . . , $Y_{M-1}$, and $Y_M$. Multiple weighted synaptic connections 31 interconnect the axons 15 to the neural modules 11, wherein each synaptic connection 31 interconnects an axon 15 to a neural module 11. Each synaptic connection 31 has a synaptic weight. The synaptic weights of the synaptic connections 31 may be represented by an N×M matrix W, wherein each synaptic connection 31 interconnecting an axon $X_i$ to a neural module $Y_j$ has a corresponding synaptic weight $W_{ij}$.

Each neural module 11 is configured to function as an N-input noisy-OR gate, wherein the set of N axons 15 represent a set of N inputs. Each synaptic connection 31 has a corresponding probability. The probabilities of the synaptic connections 31 may be represented by an N×M matrix r, wherein each synaptic connection 31 interconnecting an axon $X_i$ to a neural module $Y_j$ has a corresponding probability value $r_{ij}$. For each firing event received from an axon $X_i$ via a synaptic connection 31, each neural module $Y_j$ integrates said firing event with probability $r_{ij}$.

As stated above, embodiments of the present invention provide neural modules that model noisy-OR gates. In one embodiment, the present invention provides a neural module comprising a neuron computation circuit configured for computing an exponential function. In another embodiment, the present invention provides a neural module comprising a neuron computation circuit that includes a dendrite gate.

Figure 4:
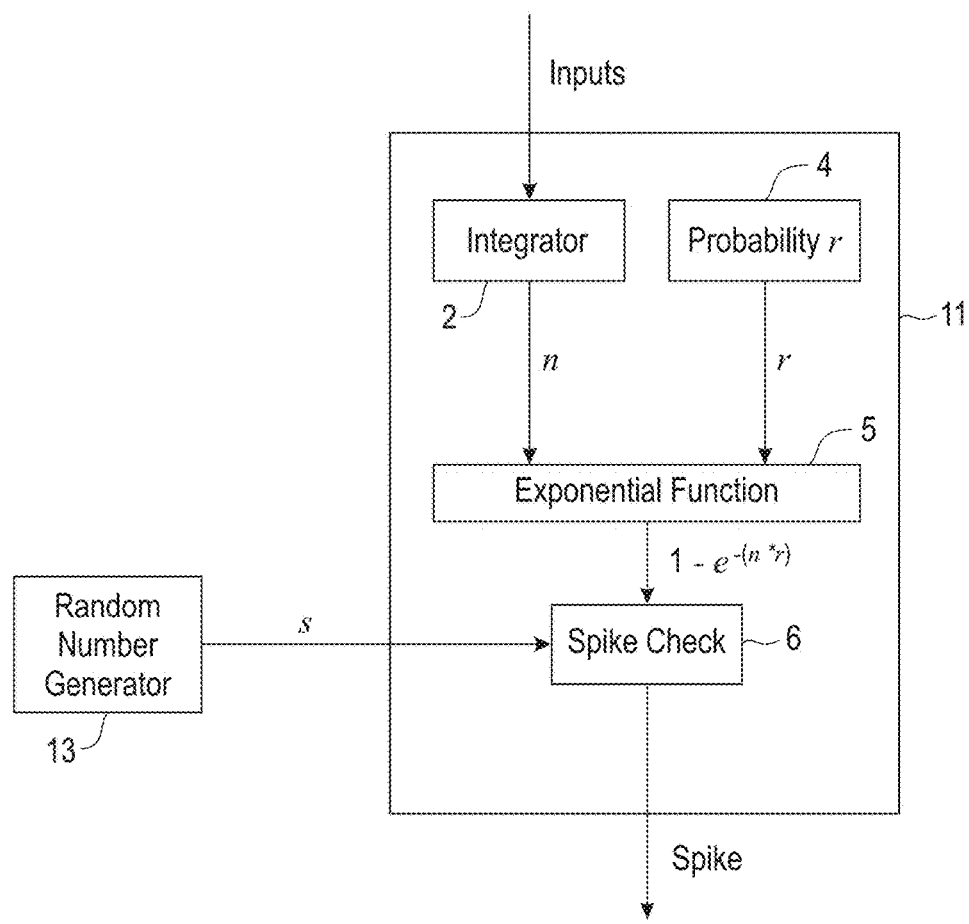
FIG. 4 is a block diagram showing a neuron computation circuit for a noisy-OR neural module, wherein the neuron computation circuit is configured to compute an exponential function, in accordance with an embodiment of the invention.

FIG. 4 is a block diagram showing a neuron computation circuit 400 for a neural module 11, wherein the neuron computation circuit 400 is configured to compute an exponential function, in accordance with an embodiment of the invention. In one embodiment, each neural module 11 comprises the neuron computation circuit 400. The circuit 400 comprises an integrator unit ("integrator") 2, a memory unit 4, an exponential function unit 5, and a spike check unit 6.

In each time step, the integrator 2 of each neural module 11 is configured to receive synaptic inputs (i.e., incoming spikes or incoming firing events) from axons 15 connected to the neural module 11 via synapses 31. In one embodiment, the synaptic inputs received are binary signals comprising of spikes and non-spikes. A spike is represented by 1, and a non-spike is represented by 0.

The memory unit 4 of each neural module 11 maintains different programmable probability values r. In one embodiment, the memory unit 4 maintains different programmable probability values r for different axon types (i.e., the probability values r are axon specific). For example, let $r_i$ denote the probability a neural module 11 integrates a synaptic input received from an axon 15 with axon type i. If an axon type is denoted as 0, 1, 2, or 3 to differentiate connections with different efficacies, each neural module 11 may maintain different programmable probability values $r_0$, $r_1$, $r_2$, and $r_3$ for the different axon types 0, 1, 2, and 3, respectively. In another embodiment, the memory unit 4 maintains different programmable probability values r for different synaptic connections 31 (i.e., the probability values r are synapse specific) or different dendrites 16 (i.e., the probability values r are dendrite specific).

The integrator 2 is further configured to integrate each synaptic input received. Specifically, for each input received via a synapse 31, the integrator 2 integrates said input only if said input is a spike and the synapse 31 is a conducting synapse. Let n denote the number of inputs integrated by the integrator 2 in a time step.

In this specification, the probability that a neural module 11 spikes ("spiking probability") is denoted as P_spk. In each time step, the exponential function unit 5 is configured to compute P_spk only if n is greater than 0. The exponential function unit 5 may compute P_spk using the following example formula: $P\_spk = 1 - e^{-(n*r)}$.

In each time step, the spike check unit 6 is configured to draw/retrieve a random number S from the PRNG 13. The spike check unit 6 determines if the random number S drawn is less than P_spk. The neural module 11 generates and sends out an outgoing spike only if the random number S drawn is less than P_spk. n is reset to zero after the neural module 11 spikes.

In another embodiment, the circuit 400 may further comprise a leak unit configured to apply a probabilistic positive leak rate to n so that the neural module 11 spikes with some probability even if all inputs received are 0 values.

Table 1 below provides example pseudo code demonstrating a sequence of operations for implementing probabilistic spiking in a $j^{th}$ neural module 11 in conjunction with the neuron computation circuit 400 in FIG. 4.

Figure 5:
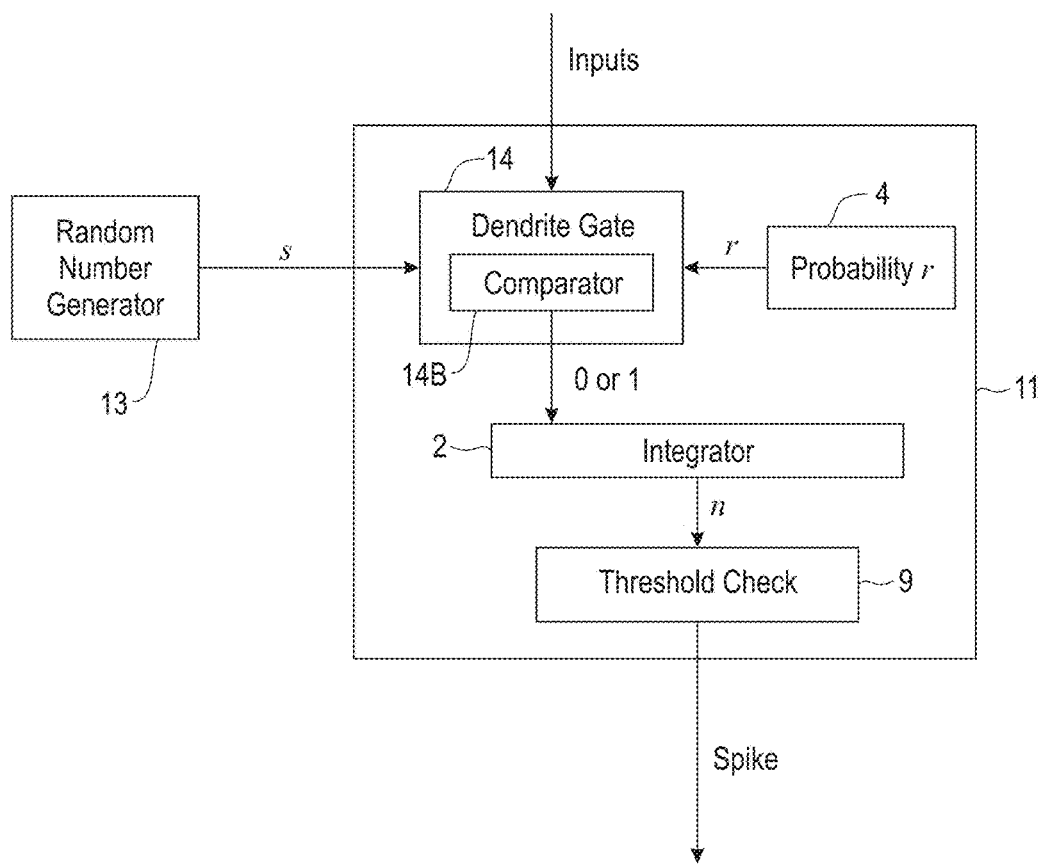
FIG. 5 is a block diagram showing a neuron computation circuit for a noisy-OR neural module, wherein the neuron computation circuit includes a dendrite gate unit, in accordance with an embodiment of the invention.

FIG. 5 is a block diagram showing a neuron computation circuit 450 for a noisy-OR neural module 11, wherein the neuron computation circuit 450 includes a dendrite gate unit 14, in accordance with an embodiment of the invention. In another embodiment, each neural module 11 comprises the neuron computation circuit 450. The circuit 450 comprises the dendrite gate unit ("dendrite gate") 14, a memory unit 4, an integrator unit ("integrator") 2, and a threshold check unit 9.

In each time step, the dendrite gate 14 of a neural module 11 is configured to receive synaptic inputs (i.e., incoming spikes or incoming firing events) from axons 15 connected to the neural module 11 via synapses 31. In one embodiment, the synaptic inputs received are binary signals comprising of spikes and non-spikes. A spike is represented by 1, and a non-spike is represented by 0.

The memory unit 4 of each neural module 11 maintains different programmable probability values r. In one embodiment, the memory unit 4 maintains different programmable probability values r for each different axon type (i.e., the probability values r are axon specific). In another embodiment, the memory unit 4 maintains different programmable probability values r for different synaptic connections 31 (i.e., the probability values r are synapse specific). In another embodiment, the memory unit 4 maintains different programmable probability values r for different dendrites 16 (i.e., the probability values r are dendrite specific). Each probability value r maintained denotes the probability that the neural module 11 integrates a synaptic input received.

The dendrite gate 14 includes a comparator component ("comparator") 14B. For each spike received via a conducting synapse 31, the dendrite gate 14 is further configured to draw a random number S from the PRNG 13, use the comparator 14B to determine whether the random number S drawn is less than a probability value r maintained in the memory unit 14, and transmit a binary signal to the integrator 2. Specifically, the dendrite gate 14 transmits a 1-bit value to the integrator 2 if the random number S drawn is less than the probability value r. The dendrite gate 14 transmits a 0-bit value to the integrator 2 if the random number S drawn reaches or exceeds the probability value r. As such, the integrator 2 integrates a spike only if a random number S drawn for the spike is less than the probability value r. Let n denote the number of inputs integrated by the integrator 2 in a time step.

Each neural module 11 has a programmable spiking threshold $V_{th}$, wherein $V_{th}$ is a positive integer. In one embodiment, the spiking threshold $V_{th}$ of each neural module 11 is set to 1, such that said neural module 11 generates and sends out an outgoing spike if the integrator 2 integrates at least one input. Specifically, the threshold check unit 9 of each neural module 11 is configured to determine if n is

TABLE 1

```
For i=1:N,  //N is the number of axons in the neural core circuit
    If A_i==1 & W_ij==1,  //the i^th axon fired & the synapse connecting the i^th axon and the j^th
                          //neural module is a conducting synapse
        n=n+1;  //Increment the number of integrated inputs, n
    Endif;
Endfor;
If n=0,
    No spike;
Else  //n>0
    Compute P_spk = 1-e^{-(n*r)};  //P_spk is the probability that the j^th neural module spikes
    Draw a uniform random number S;  //S is between 0 and 1
    If S<P_spk,  //Compare S to P_spk
        Send out a spike;  //The j^th neural module generates a spike only if S<P_spk
    Endif;
Endif;
``` greater than zero. If n is zero, the threshold check unit 9 will not generate a spike. If n is greater than zero, the threshold check unit 9 generates and sends out an outgoing spike.

Table 2 below provides example pseudo code demonstrating a sequence of operations for implementing probabilistic spiking in a $j^{th}$ neural module 11 in conjunction with the neuron computation circuit 450 in FIG. 5, wherein the spiking threshold $V_{th}$ of the $j^{th}$ neural module 11 is set to 1.

TABLE 2

```
For i=1:N,  //N is the number of axons in the neural core circuit
    If A_i==1 & W_ij==1,    //the i^th axon fired & the synapse connecting the i^th axon and the j^th
                            //neural module is a conducting synapse
        Draw a uniform random number S;  //S is between 0 and 1
        If S<r,   //Compare S to the probability r maintained in the j^th neural module
            n=n+1;  //Increment the number of integrated inputs, n
        Endif;
    Endif;
Endfor;
If n<=0,
    No spike;
Else
    Send out a spike;    //The j^th neural module generates a spike only if n>0
Endif;
```

In another embodiment, the spiking threshold $V_{th}$ of each neural module 11 is greater than 1. As such, the threshold check unit 9 of each neural module 11 is configured to determine whether the number of integrated inputs n exceeds the spiking threshold $V_{th}$ of said neural module 11. Specifically, if n is less than or equal to $V_{th}$, the threshold check unit 9 will not generate a spike. If n exceeds $V_{th}$, the threshold check unit 9 generates and sends out an outgoing spike.

Table 3 below provides example pseudo code demonstrating a sequence of operations for implementing probabilistic spiking in a $j^{th}$ neural module 11 in conjunction with the neuron computation circuit 450 in FIG. 5, wherein the spiking threshold $V_{th}$ of the $j^{th}$ neural module 11 is greater than 1.

TABLE 3

```
For i=1:N,  //N is the number of axons in the neural core circuit
    If A_i==1 & W_ij==1,    //the i^th axon fired & the synapse connecting the i^th axon and the j^th
                            //neural module is a conducting synapse
        Draw a uniform random number S;  //S is between 0 and 1
        If S<r,   //Compare S to the probability r maintained in the j^th neural module
            n=n+1;  //Increment the number of integrated inputs, n
        Endif;
    Endif;
Endfor;
If n<=V_th,  //Compare n to the spiking threshold V_th of the j^th neural module
    No spike;
Else
    Send out a spike;    //The j^th neural module generates a spike only if n>V_th
Endif;
```

In another embodiment, the circuit 450 may further comprise a leak unit configured to apply a probabilistic positive leak rate to n so that the neural module 11 spikes with some probability even if all inputs received are 0.

Figure 6:
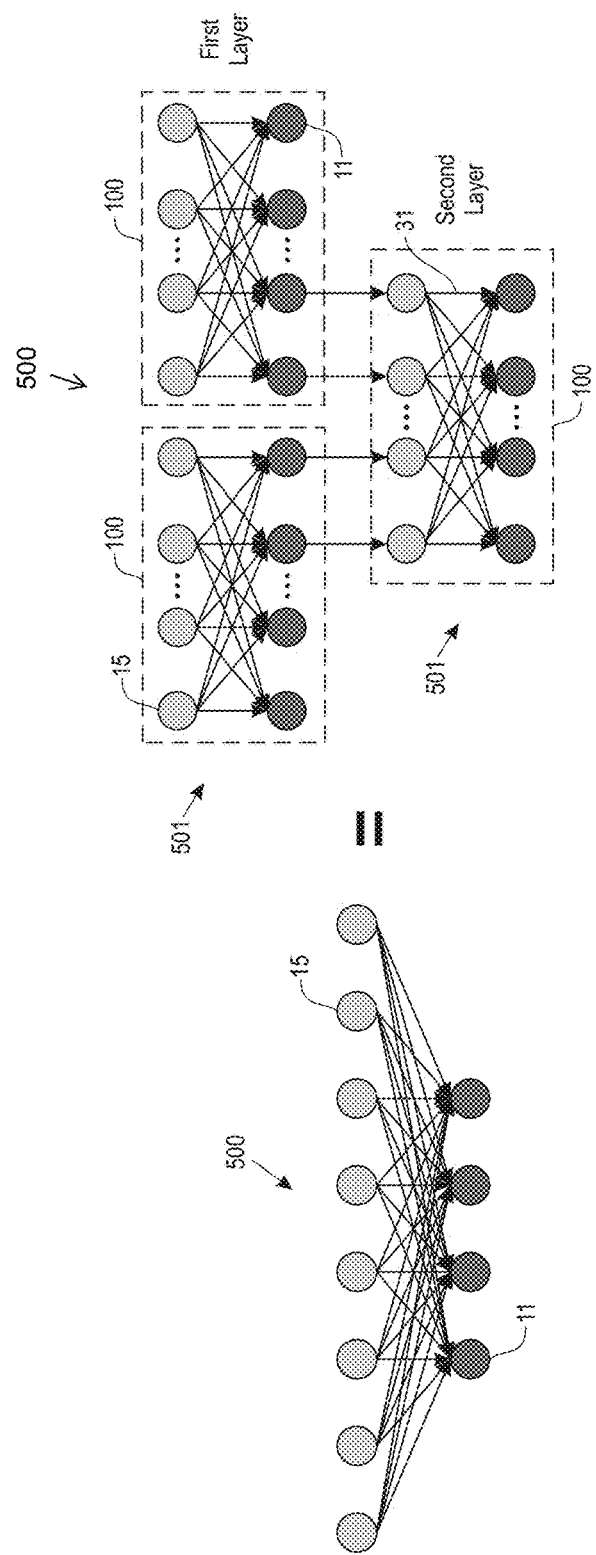
FIG. 6 shows a scalable noisy-OR neural network, in accordance with an embodiment of the invention.

FIG. 6 shows a scalable noisy-OR neural network 500, in accordance with an embodiment of the invention. The number of inputs received by a neural module 11 is limited by the size of the crossbar 12 of the neural core circuit 100 containing the neural module 11. For example, for a neural core circuit 100 having only 256 incoming axons, the number of inputs that a neural module 11 of the neural core circuit 100 can receive is limited to 256.

Each neural module 11 in the network 500 receives more inputs that a neural core circuit 100 containing said neural module 11 is capable of receiving. To overcome the size limitations of each individual neural core circuit 100, the network 500 may be implemented by organizing multiple neural core circuits 100 into multiple layers 501 of neural core circuits 100. Each layer 501 comprises at least one neural core circuit 100. Each neural module 11 of a first layer 501 (e.g., First Layer) is configured to model a noisy-OR gate, wherein the output (e.g., spike) generated is based on more than 256 inputs. Each neural module 11 of a second layer 501 (e.g., Second Layer) or an intermediate layer 501 is configured to model a pure OR gate. The second layer 501 and the intermediate layers 501 (i.e., the subsequent layers 501 after the first layer 501) are configured to integrate all input received. Output from one layer 501 are routed to a subsequent layer 501 using address-event packets.

Figure 7:
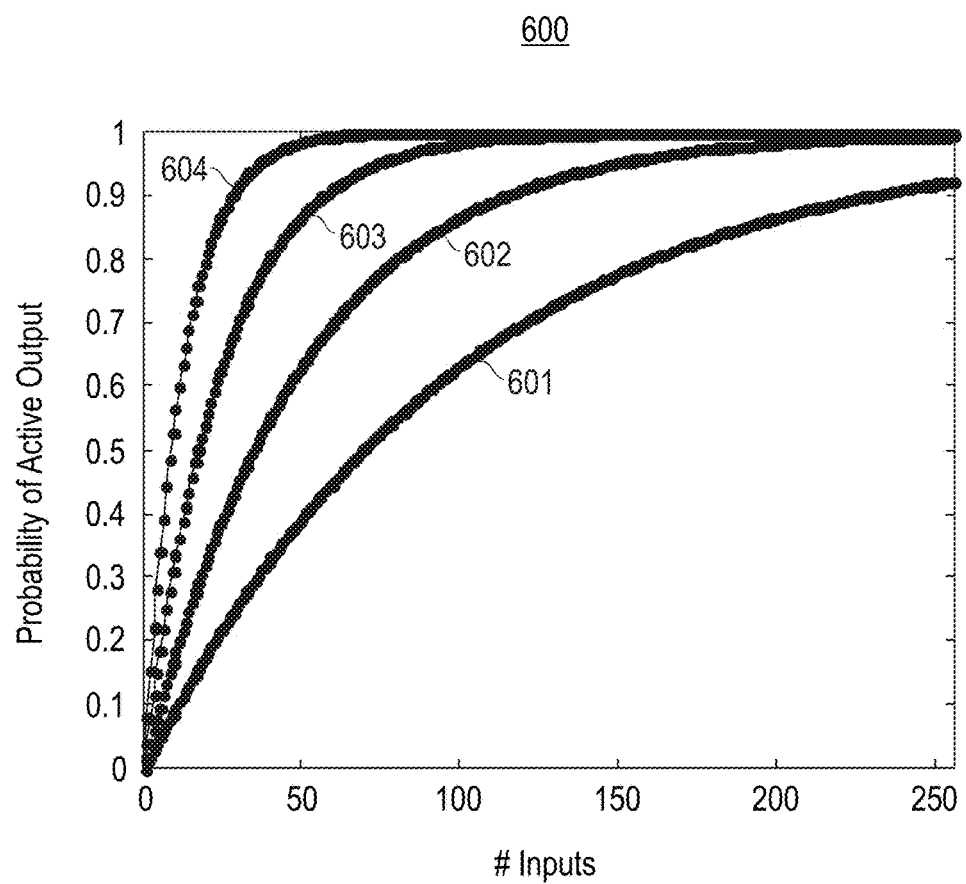
FIG. 7 is an example graph plotting the spiking probabilities of different example noisy-OR neural modules, wherein each neural module has a different probability r, in accordance with an embodiment of the invention.

FIG. 7 shows an example graph 600 plotting the spiking probabilities of different example noisy-OR neural modules 11, wherein each neural module 11 has a different probability value r, in accordance with an embodiment of the invention. Each curve 601, 602, 603, and 604 represents a neural module 11 having a spiking threshold $V_{th}$ set to 1. As such, each neural module 11 represented in the graph 600 generates an outgoing spike if the number of integrated inputs n in said neural module 11 is greater than zero. Increasing the probability value r of a neural module 11 sharpens the slope of the curve representing the neural module 11.

Figure 8:
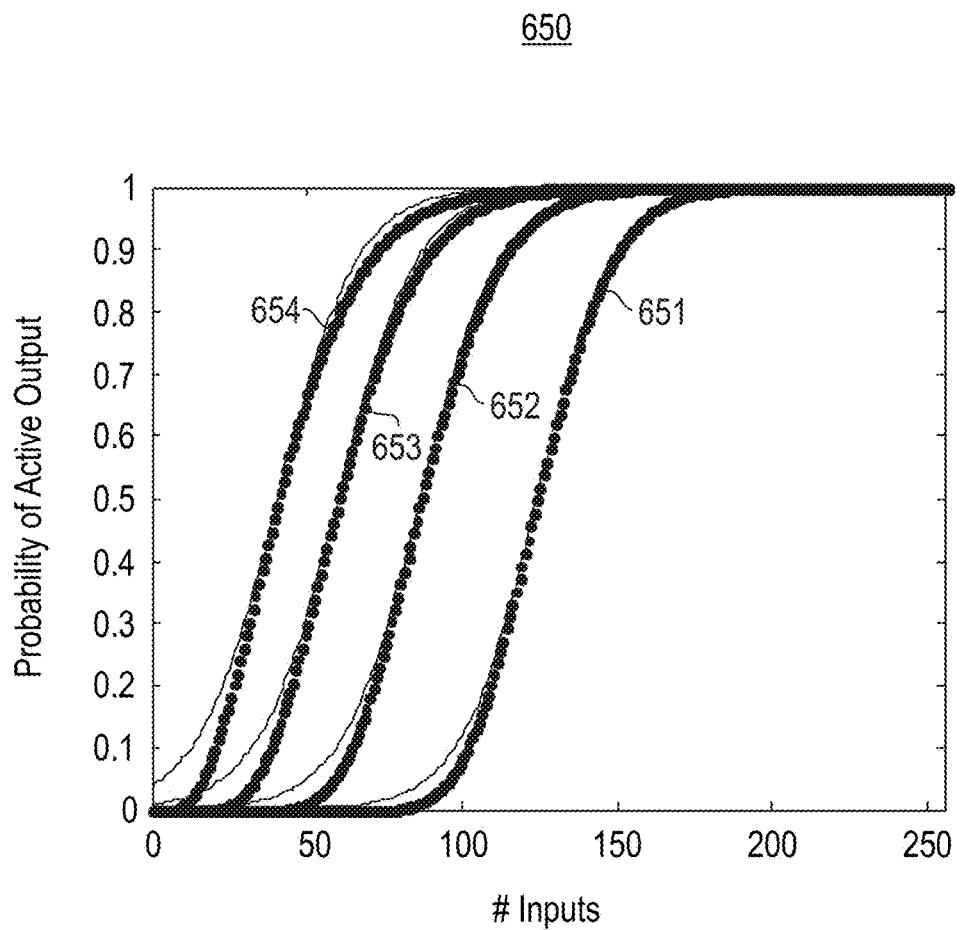
FIG. 8 is an example graph plotting the spiking probabilities of different example noisy-OR neural modules, wherein each neural module has a different spiking threshold $V_{th}$, in accordance with an embodiment of the invention.

FIG. 8 shows an example graph 650 plotting the spiking probabilities of different example noisy-OR neural modules 11, wherein each neural module 11 has a different spiking threshold $V_{th}$, in accordance with an embodiment of the invention. Each curve 651, 652, 653, and 654 represents a neural module 11 having a spiking threshold $V_{th}$ that is greater than 1. As such, each curve 651, 652, 653, and 654 represents a noisy sigmoid. Sigmoids are utilized in multiple types of neural and Bayesian network applications, such as Restricted Boltzmann machines.

Increasing the spiking threshold $V_{th}$ of a neural module 11 shifts the sigmoid representing the neural module 11 further to the right. For example, the curve 651 represents a neural module 11 having a spiking threshold $V_{th}$ that is greater than a different spiking threshold $V_{th}$ maintained in a neural module 11 that is represented by the curve 654.

Figure 9:
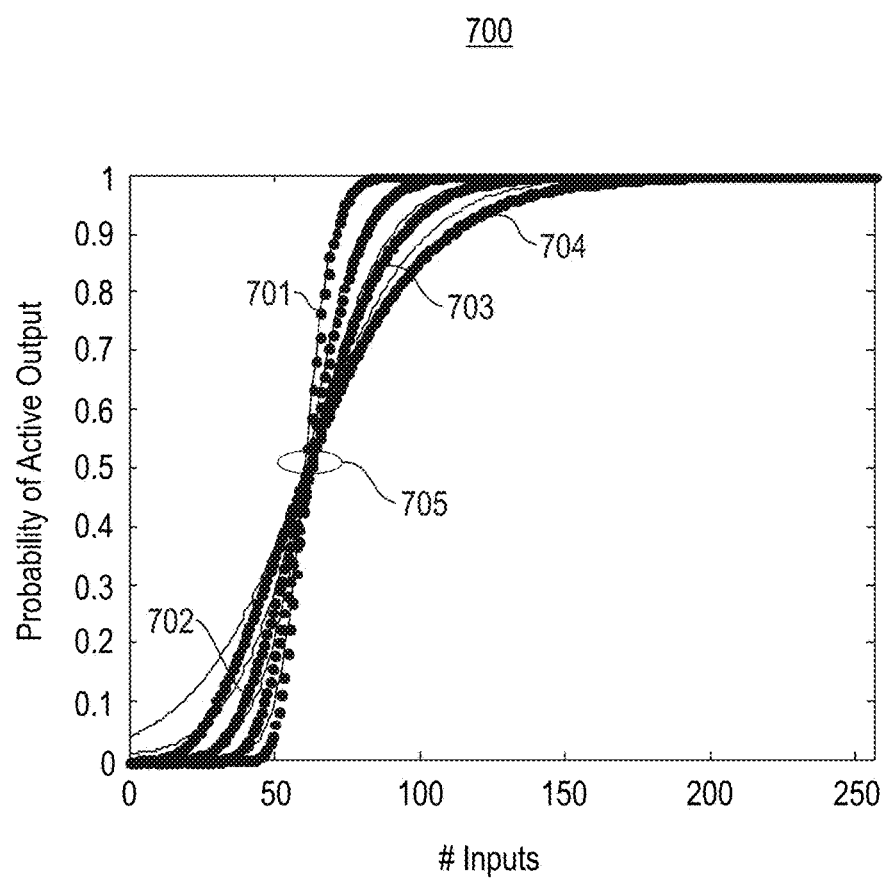
FIG. 9 is an example graph plotting the spiking probabilities of different example noisy-OR neural modules, wherein each neural module has a different spiking threshold $V_{th}$ and maintains a different probability r, in accordance with an embodiment of the invention.

FIG. 9 shows an example graph 700 plotting the spiking probabilities of different example noisy-OR neural modules 11, wherein each neural module 11 has a different spiking threshold $V_{th}$ and maintains a different probability value r, in accordance with an embodiment of the invention. Each curve 701, 702, 703, and 704 represents a noisy sigmoid. Increasing the probability value r of a neural module 11 sharpens the slope of the sigmoid representing the neural module 11. The curves intersect at reference point 705. The reference point 705 also indicates the half-way point of each curve. As such, the half-way point of a curve is preserved as the slope of the curve changes.

Figure 10:
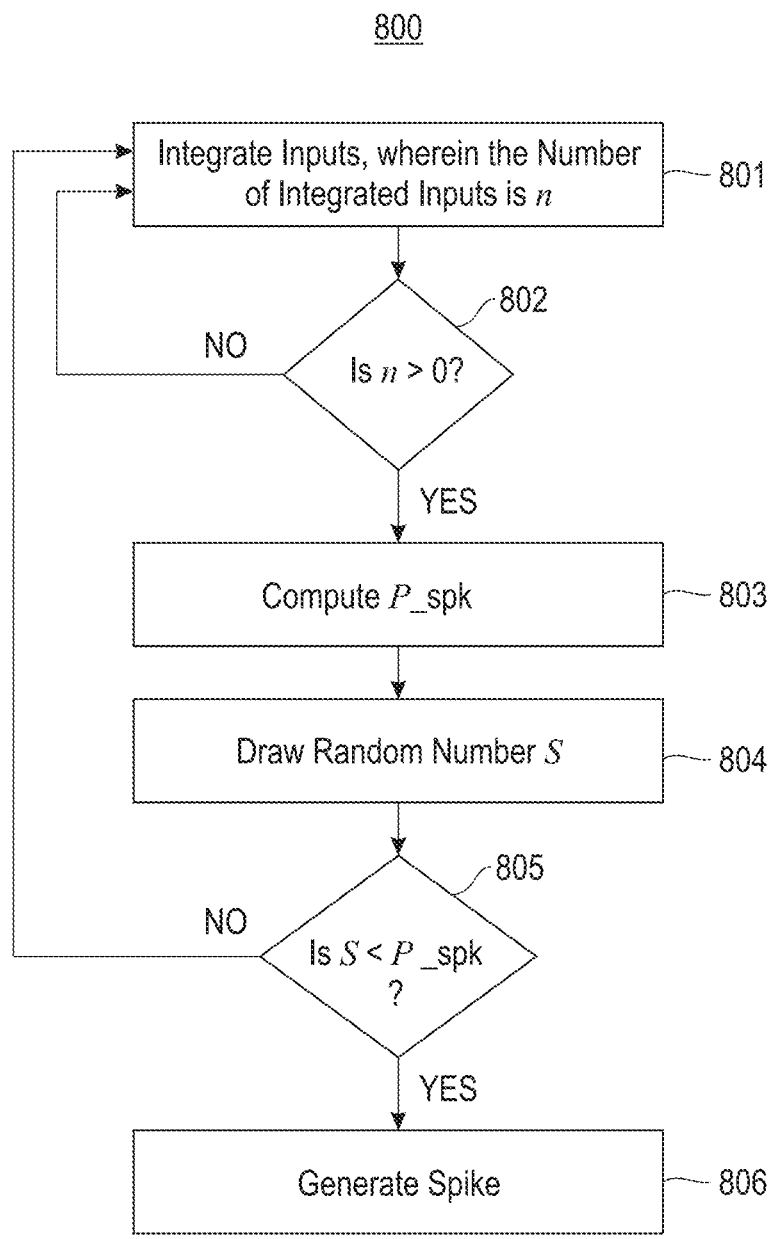
FIG. 10 is a flowchart of an example process for implementing probabilistic spiking in a neural module, wherein the process includes computing an exponential function, in accordance with an embodiment of the invention.

FIG. 10 is a flowchart of an example process 800 for implementing probabilistic spiking in a neural module, wherein the process 800 includes computing an exponential function, in accordance with an embodiment of the invention. In process block 801, synaptic inputs (e.g., incoming spikes) are integrated, wherein the number of inputs integrated is denoted as n. In process block 802, whether n is greater than zero is determined. If n is equal to zero, return to process block 801. If n is greater than zero, the probability that the neural module will spike ("P_spk") is determined, as shown in process block 803. In one example implementation, P_spk is determined by computing $1-e^{-(n*r)}$. In process block 804, a random number S is drawn (e.g., from a pseudo-random number generator). In process block 805, whether S is less than P_spk is determined. If S is less than P_spk, proceed to process block 806 where the neural module generates and sends an outgoing spike. If S is equal to or greater than P_spk, return to process block 801.

Figure 11:
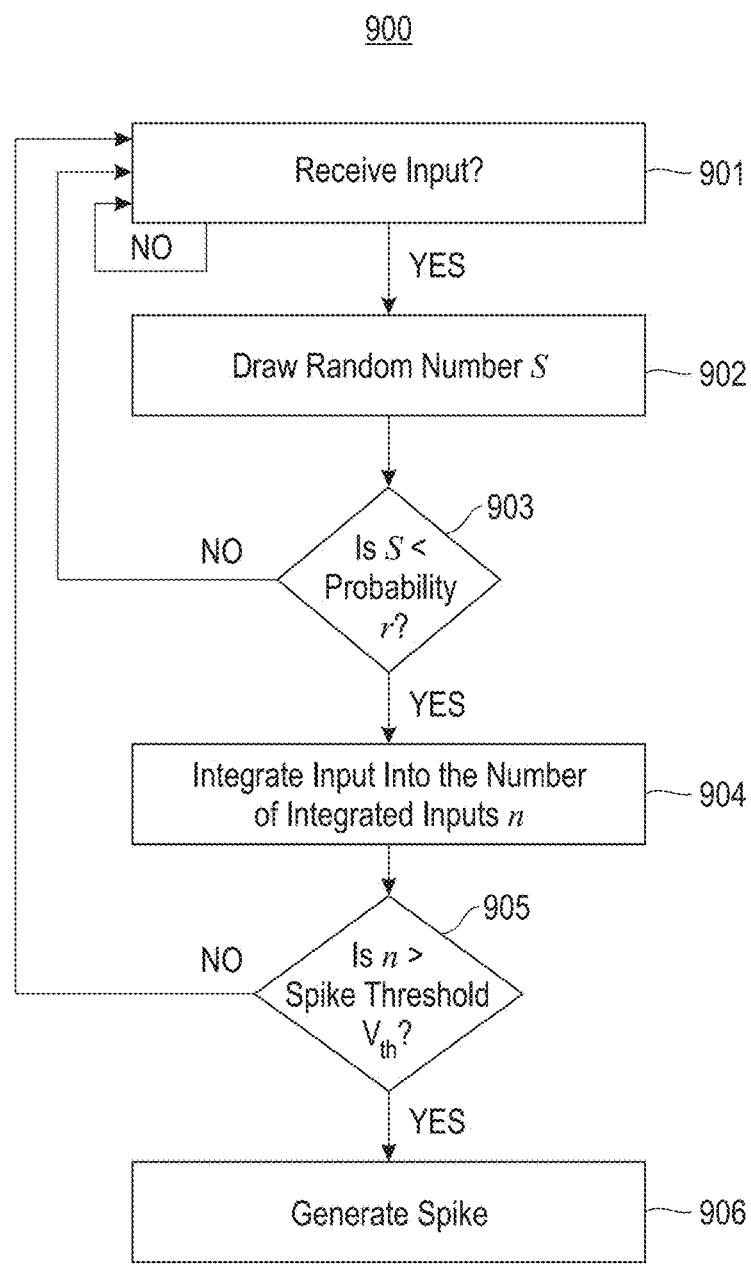
FIG. 11 is a flowchart of an example process for implementing probabilistic spiking in a neural module, wherein the process includes determining whether the number of inputs integrated in the neural module is greater than a spiking threshold of the neural module, in accordance with an embodiment of the invention.

FIG. 11 is a flowchart of an example process 900 for implementing probabilistic spiking in a neural module, wherein the process 900 includes determining whether the number of inputs integrated in the neural module is greater than a spiking threshold of the neural module, in accordance with an embodiment of the invention. In process block 901, whether a synaptic input (e.g., a spike) is received is determined. If an input is received, a random number S is drawn (e.g., from a pseudo-random number generator) as shown in process block 902. If no input is received, return to process block 901. In process block 903, whether S is less than a probability value r maintained in the neural module is determined. If S is less than r, the neural module integrates the received input by incrementing n, wherein n represents the number of integrated inputs, as shown in process block 904. If S is equal to or greater than r, the neural module ignores the received input and returns to process block 901.

In process block 905, whether n is greater than a spiking threshold $V_{th}$ of the neural module is determined. If n is greater than $V_{th}$, the neural module generates and sends an outgoing spike as shown in process block 906. If n is less than or equal to $V_{th}$, return to process block 901.

Figure 12:
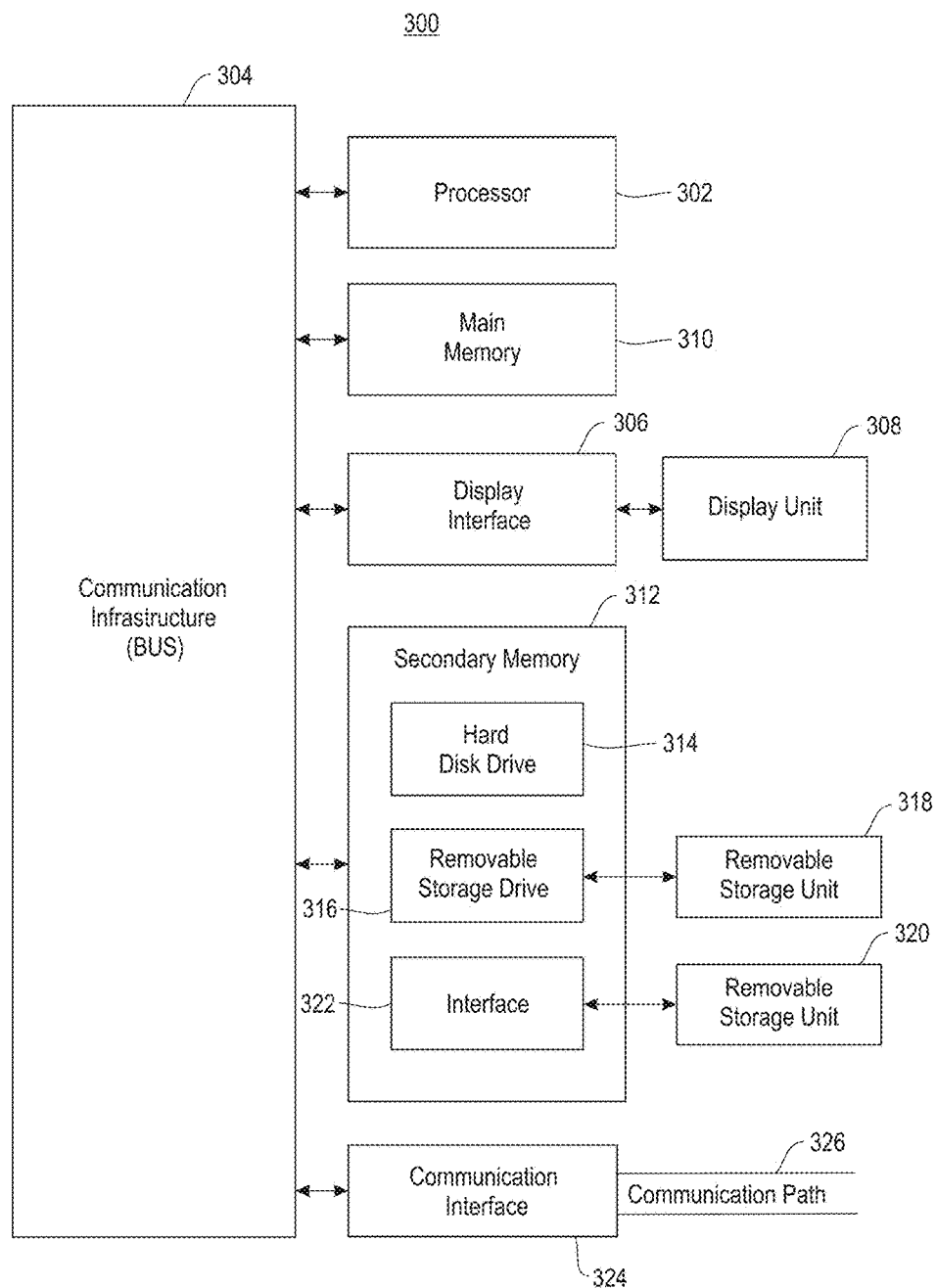
FIG. 12 shows a high level block diagram of an information processing system useful for implementing one embodiment of the present invention.

FIG. 12 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for neuromorphic event-driven neural computing in a scalable neural network. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   at an electronic neuron of a neural core circuit:
   receiving at least one incoming firing event from at least one electronic axon connected to the electronic neuron via at least one electronic synapse;
   maintaining, on a memory device of the electronic neuron, at least one programmable probability value, wherein each programmable probability value represents a probability that the electronic neuron integrates an incoming firing event received; and
   modeling the electronic neuron as a noisy-OR gate configured to perform one or more Bayesian computations by:
   probabilistically integrating, via a computation circuit of the electronic neuron, the at least one incoming firing event received based on the at least one programmable probability value; and
   probabilistically generating, via the computation circuit of the electronic neuron, an outgoing firing event based on a number of incoming firing events integrated and the at least one programmable probability value.

2. The method of claim 1, wherein probabilistically integrating the at least one incoming firing event received comprises:
   for each incoming firing event received from each electronic axon:
   determining whether an electronic synapse connecting the electronic axon to the electronic neuron is a conducting synapse; and
   integrating the incoming firing event in response to determining the electronic synapse is a conducting synapse.

3. The method of claim 2, wherein probabilistically generating an outgoing firing event comprises:
   determining a spiking probability of the electronic neuron spiking based on an exponential function, the number of incoming firing events integrated, and the at least one programmable probability value;
   drawing a random number from a pseudo-random number generator of the electronic neuron;
   determining whether a condition is satisfied by comparing the random number drawn against the spiking probability determined; and
   generating an outgoing firing event in response to determining that the condition is satisfied.

4. The method of claim 3, wherein the condition is satisfied if the random number drawn is less than the spiking probability determined, and the one or more Bayesian computations comprise at least one of statistical interference, recognizing patterns and classifying inputs.

5. The method of claim 1, wherein probabilistically integrating the at least one incoming firing event received comprises:
   for each incoming firing event received from each electronic axon:
   determining whether an electronic synapse connecting the electronic axon to the electronic neuron is a conducting synapse; and
   in response to determining the electronic synapse is a conducting synapse:
   drawing a random number from a pseudo-random number generator of the electronic neuron;
   determining whether a condition is satisfied by comparing the random number drawn against the at least one programmable probability value;
   integrating the incoming firing event in response to determining that the condition is satisfied; and
   generating an outgoing firing event in response to integrating the incoming firing event.

6. The method of claim 5, wherein the condition is satisfied if the random number drawn is less than the at least one programmable probability value, and the one or more Bayesian computations comprise at least one of statistical interference, recognizing patterns and classifying inputs.

7. A system comprising a computer processor, a computer-readable hardware storage medium, and program code embodied with the computer-readable hardware storage medium for execution by the computer processor to implement a method comprising:
   at an electronic neuron of a neural core circuit:
   receiving at least one incoming firing event from at least one electronic axon connected to the electronic neuron via at least one electronic synapse;
   maintaining, on a memory device of the electronic neuron, at least one programmable probability value, wherein each programmable probability value represents a probability that the electronic neuron integrates an incoming firing event received; and modeling the electronic neuron as a noisy-OR gate configured to perform one or more Bayesian computations by:

probabilistically integrating, via a computation circuit of the electronic neuron, the at least one incoming firing event received based on the at least one programmable probability value; and probabilistically generating, via the computation circuit of the electronic neuron, an outgoing firing event based on a number of incoming firing events integrated and the at least one programmable probability value.

8. The system of claim 7, wherein probabilistically integrating the at least one incoming firing event received comprises:

for each incoming firing event received from each electronic axon:

determining whether an electronic synapse connecting the electronic axon to the electronic neuron is a conducting synapse; and integrating the incoming firing event in response to determining the electronic synapse is a conducting synapse.

9. The system of claim 8, wherein probabilistically generating an outgoing firing event comprises:

determining a spiking probability of the electronic neuron spiking based on an exponential function, the number of incoming firing events integrated, and the at least one programmable probability value;

drawing a random number from a pseudo-random number generator of the electronic neuron;

determining whether a condition is satisfied by comparing the random number drawn against the spiking probability determined; and generating an outgoing firing event in response to determining that the condition is satisfied.

10. The system of claim 9, wherein the condition is satisfied if the random number drawn is less than the spiking probability determined, and the one or more Bayesian computations comprise at least one of statistical interference, recognizing patterns and classifying inputs.

11. The system of claim 7, wherein probabilistically integrating the at least one incoming firing event received comprises:

for each incoming firing event received from each electronic axon:

determining whether an electronic synapse connecting the electronic axon to the electronic neuron is a conducting synapse; and in response to determining the electronic synapse is a conducting synapse:

drawing a random number from a pseudo-random number generator of the electronic neuron;

determining whether a condition is satisfied by comparing the random number drawn against the at least one programmable probability value;

integrating the incoming firing event in response to determining that the condition is satisfied; and generating an outgoing firing event in response to integrating the incoming firing event.

12. The system of claim 11, wherein the condition is satisfied if the random number drawn is less than the at least one programmable probability value, and the one or more Bayesian computations comprise at least one of statistical interference, recognizing patterns and classifying inputs.

13. A computer program product comprising a computer-readable hardware storage medium having program code embodied therewith, the program code being executable by a computer to implement a method comprising:

at an electronic neuron of a neural core circuit:

receiving at least one incoming firing event from at least one electronic axon connected to the electronic neuron via at least one electronic synapse;

maintaining, on a memory device of the electronic neuron, at least one programmable probability value, wherein each programmable probability value represents a probability that the electronic neuron integrates an incoming firing event received; and modeling the electronic neuron as a noisy-OR gate configured to perform one or more Bayesian computations by:

probabilistically integrating, via a computation circuit of the electronic neuron, the at least one incoming firing event received based on the at least one programmable probability value; and probabilistically generating, via the computation circuit of the electronic neuron, an outgoing firing event based on a number of incoming firing events integrated and the at least one programmable probability value.

14. The computer program product of claim 13, wherein probabilistically integrating the at least one incoming firing event received comprises:

for each incoming firing event received from each electronic axon:

determining whether an electronic synapse connecting the electronic axon to the electronic neuron is a conducting synapse; and integrating the incoming firing event in response to determining the electronic synapse is a conducting synapse.

15. The computer program product of claim 14, wherein probabilistically generating an outgoing firing event comprises:

determining a spiking probability of the electronic neuron spiking based on an exponential function, the number of incoming firing events integrated, and the at least one programmable probability value;

drawing a random number from a pseudo-random number generator of the electronic neuron;

determining whether a condition is satisfied by comparing the random number drawn against the spiking probability determined; and generating an outgoing firing event in response to determining that the condition is satisfied.

16. The computer program product of claim 15, wherein the condition is satisfied if the random number drawn is less than the spiking probability determined, and the one or more Bayesian computations comprise at least one of statistical interference, recognizing patterns and classifying inputs.

17. The computer program product of claim 13, wherein probabilistically integrating the at least one incoming firing event received comprises:

for each incoming firing event received from each electronic axon:

determining whether an electronic synapse connecting the electronic axon to the electronic neuron is a conducting synapse; and in response to determining the electronic synapse is a conducting synapse:

drawing a random number from a pseudo-random number generator of the electronic neuron;

determining whether a condition is satisfied by comparing the random number drawn against the at least one programmable probability value;

integrating the incoming firing event in response to determining that the condition is satisfied; and generating an outgoing firing event in response to integrating the incoming firing event.

18. The computer program product of claim 17, wherein the condition is satisfied if the random number drawn is less than the at least one programmable probability value, and the one or more Bayesian computations comprise at least one of statistical interference, recognizing patterns and classifying inputs.

* * * * *